United States Patent
Chalmer et al.

(10) Patent No.: US 9,898,316 B1
(45) Date of Patent: Feb. 20, 2018

(54) EXTENDED FRACTIONAL SYMMETRIC MULTI-PROCESSING CAPABILITIES TO GUEST OPERATING SYSTEMS

(75) Inventors: Steve Chalmer, Auburndale, MA (US); John Forecast, Newton, MA (US); Matthew H. Fredette, Belmont, MA (US); Steven T. McClure, Northboro, MA (US); Serge J. Pirotte, Coventry, RI (US); David L. Reese, Westborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 1163 days.

(21) Appl. No.: 13/200,777

(22) Filed: Sep. 30, 2011

(51) Int. Cl.
  G06F 9/455 (2006.01)
  G06F 9/46 (2006.01)
  G06F 9/50 (2006.01)

(52) U.S. Cl.
  CPC ...... G06F 9/45545 (2013.01); G06F 9/45537 (2013.01); *G06F 9/5077* (2013.01)

(58) Field of Classification Search
  CPC ....... G06F 2009/45566; G06F 9/45533; G06F 9/45545; G06F 9/45558
  See application file for complete search history.

(56) References Cited

U.S. PATENT DOCUMENTS

| | | | |
|---|---|---|---|
| 5,206,939 A | 4/1993 | Yanai et al. | |
| 5,778,394 A | 7/1998 | Galtzur et al. | |
| 5,845,147 A | 12/1998 | Vishlitzlcy et al. | |
| 5,857,208 A | 1/1999 | Ofek | |
| 7,191,440 B2 * | 3/2007 | Cota-Robles et al. | 718/1 |
| 7,412,702 B1 * | 8/2008 | Nelson et al. | 718/1 |
| 7,665,088 B1 | 2/2010 | Bugnion et al. | |
| 7,743,389 B2 | 6/2010 | Mahalingam et al. | |
| 7,945,436 B2 * | 5/2011 | Ang | G06F 9/45558 703/23 |
| 8,539,499 B1 * | 9/2013 | Tovpeko et al. | 718/104 |
| 2004/0111596 A1 | 6/2004 | Rawson, III | 713/1 |

(Continued)

OTHER PUBLICATIONS

"Enginuity: The EMC Symmetrix Storage Operating Environment: A Detailed Review," White paper, EMC Corporation, Oct. 2010, 28 pp.

(Continued)

*Primary Examiner* — Bing Zhao
(74) *Attorney, Agent, or Firm* — Muirhead and Saturnelli, LLC

(57) ABSTRACT

Operating at least one hypervisor includes running a first hypervisor as a first thread of an underlying operating system, running a second hypervisor as a second thread of the underlying operating system, loading a first guest operating system using the first hypervisor based on the first thread of the underlying operating system, loading a second guest operating system using the second hypervisor based on the second thread of the underlying operating system, and scheduling sharing of resources of the underlying system between the first hypervisor and the second hypervisor according to a scheduler of the underlying operating system, where the first hypervisor and the second hypervisor run independently of each other. The scheduler of the underlying operating system may schedule fractional time shares for the first hypervisor and the second hypervisor to access the same resource.

20 Claims, 9 Drawing Sheets

(56) References Cited

U.S. PATENT DOCUMENTS

| | | |
|---|---|---|
| 2007/0157198 A1* | 7/2007 | Bennett et al. .................... 718/1 |
| 2009/0119684 A1* | 5/2009 | Mahalingam ....... G06F 9/45558 719/324 |
| 2010/0325454 A1 | 12/2010 | Parthasarathy ............... 713/320 |
| 2011/0161955 A1* | 6/2011 | Woller .................. G06F 9/4406 718/1 |
| 2011/0219234 A1 | 9/2011 | Bogner ......................... 713/175 |
| 2011/0289500 A1 | 11/2011 | Strutt ............................... 718/1 |
| 2012/0216187 A1 | 8/2012 | Ben-Yehuda et al. ............ 718/1 |
| 2013/0036323 A1 | 2/2013 | Goose et al. ................ 714/4.11 |

OTHER PUBLICATIONS

U.S. Appl. No. 13/249,422, filed Sep. 30, 2011, Chalmer, et al.

\* cited by examiner

EXTENDED FRACTIONAL SYMMETRIC MULTI-PROCESSING CAPABILITIES TO GUEST OPERATING SYSTEMS

TECHNICAL FIELD

This application is related to the field of virtualized computing environments and, more particularly, the use of hypervisors.

BACKGROUND OF THE INVENTION

Host processor systems may store and retrieve data using a storage device containing a plurality of host interface units (I/O modules), disk drives, and disk interface units (disk adapters). Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek, which are incorporated herein by reference. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data stored therein.

A hypervisor is a software implementation providing a software virtualization environment in which other software may run with the appearance of having full access to the underlying system hardware, but in which such access is actually under the complete control of the hypervisor. The software running in such a hypervisor managed environment may execute within a virtual machine (VM) and multiple VMs may be managed simultaneously by a hypervisor. Hypervisors may generally be classed as type 1 or type 2, depending on whether the hypervisor is running in a supervisor mode on "bare metal" (type 1) or is itself hosted by an operating system, (OS) (type 2). A bare metal environment describes a computer system in which a VM is installed directly on hardware rather than within a host OS. ESX and ESXi, produced by VMware of Palo Alto, Calif., are examples of bare-metal hypervisors that may run directly on server hardware without requiring an additional underlying operating system. For discussions of the use of known hypervisors (or "virtual machine monitors") in virtualized computing environments, see, for example, U.S. Pat. Nos. 7,665,088; 7,743,389; and 7,945,436, which are all assigned to VMware, Inc. and which are all incorporated herein by reference. Although the term "hypervisor" is principally used herein, this term should be understood herein to refer to any appropriate software layer having the described features and functions discussed herein.

Accordingly, it would be desirable to provide a system and techniques for advantageously operating hypervisors in connection with the scheduling and sharing of resources, particularly in connection with storage systems.

SUMMARY OF THE INVENTION

According to the system described herein, operating a hypervisor includes running a hypervisor as a thread of an underlying operating system and loading a guest operating system using the hypervisor based on the thread of the underlying operating system, where the hypervisor runs independently of the guest operating system and independently of other hypervisors running as other threads of the underlying operating system. The hypervisor may be a first hypervisor and operating a hypervisor may further include running a second hypervisor nested with the first hypervisor, where the guest operating system may be loaded using both the first hypervisor and the second hypervisor. The underlying operating system may be an operating system of a storage system. The hypervisor may be embedded with the storage system. Operating a hypervisor may also include modifying code of the hypervisor independently of code of the guest operating system. Operating a hypervisor may also include modifying code of the hypervisor independently of code of the other hypervisors. The hypervisor may share resources with the other hypervisors according to scheduling processes of the underlying operating system.

According further to the system described herein, a non-transitory computer readable medium stores software for operating a hypervisor. The software includes executable code that runs a hypervisor as a thread of an underlying operating system and executable code that loads a guest operating system using the hypervisor based on the thread of the underlying operating system, where the hypervisor runs independently of the guest operating system and independently of other hypervisors running as other threads of the underlying operating system. The hypervisor may be first hypervisor, and the software may further include executable code that runs a second hypervisor nested with the first hypervisor, where the guest operating system is loaded using both the first hypervisor and the second hypervisor. The underlying operating system may be an operating system of a storage system. The hypervisor may be embedded with the storage system. The software may further include executable code that modifies code of the hypervisor independently of code of the guest operating system. The software may further include executable code that modifies code of the hypervisor independently of code of the other hypervisors. The hypervisor may share resources with the other hypervisors according to scheduling processes of the underlying operating system.

According further to the system described herein, a system using hypervisors includes at least one processor providing processing resources for an underlying operating system and a computer-readable medium storing software for operating a hypervisor. The software includes executable code that runs the hypervisor as a thread of the underlying operating system and executable code that loads a guest operating system using the hypervisor based on the thread of the underlying operating system and uses the processing resources, where the hypervisor runs independently of the guest operating system and independently of other hypervisors running as other threads of the underlying operating system. The hypervisor may be a first hypervisor, and the software may further include executable code that runs a second hypervisor nested with the first hypervisor, where the guest operating system is loaded using both the first hypervisor and the second hypervisor. The underlying operating system may be an operating system of a storage system. The hypervisor may be embedded with the storage system. The at least one processor may include at least one CPU core of the storage system. The hypervisor may share the processing resources with the other hypervisors according to scheduling processes of the underlying operating system.

According further to the system described herein, operating at least one hypervisor includes running a first hypervisor as a first thread of an underlying operating system, running a second hypervisor as a second thread of the underlying operating system, loading a first guest operating system using the first hypervisor based on the first thread of the underlying operating system, loading a second guest operating system using the second hypervisor based on the second thread of the underlying operating system, and scheduling sharing of resources of the underlying system between the first hypervisor and the second hypervisor according to a scheduler of the underlying operating system, where the first hypervisor and the second hypervisor run independently of each other. The scheduler of the underlying operating system may schedule fractional time shares for the first hypervisor and the second hypervisor to access the same resource. The resource may be a CPU core of a storage system operating, and where the underlying operating system may operate the storage system. The scheduler of the underlying operating system may schedule fractional time shares for the first hypervisor and the second hypervisor to access multiple resources operating in a symmetric multi-processing regime. The first hypervisor and the second hypervisor may be part of the same hypervisor running the first and second threads independently. The first hypervisor and the second hypervisor may run independently of the first and second guest operating systems. The underlying operating system may operate a storage system, and the first and second hypervisors may be embedded with the storage system.

According further to the system described herein, a non-transitory computer readable medium stores software for operating at least one hypervisor. The software includes executable code that runs a first hypervisor as a first thread of an underlying operating system, executable code that runs a second hypervisor as a second thread of the underlying operating system, executable code that loads a first guest operating system using the first hypervisor based on the first thread of the underlying operating system, executable code that loads a second guest operating system using the second hypervisor based on the second thread of the underlying operating system, and executable code that schedules sharing resources of the underlying system between the first hypervisor and the second hypervisor according to a scheduler of the underlying operating system, where the first hypervisor and the second hypervisor run independently of each other. Executable code that schedules sharing of the resources may schedule fractional time shares for the first hypervisor and the second hypervisor to access the same resource. The same resource may include a CPU core of a storage system, and the underlying operating system may operate the storage system. Executable code that schedules sharing of the resources may schedule fractional time shares for the first hypervisor and the second hypervisor to access multiple resources operating in a symmetric multi-processing regime. The first hypervisor and the second hypervisor may be part of the same hypervisor running the first and second threads independently. The first hypervisor and the second hypervisor may run independently of the first and second guest operating systems. The underlying operating system may operate a storage system, and the first and second hypervisors may be embedded with the storage system.

According further to the system described herein, a system using hypervisors includes at least one processor providing processing resources for an underlying operating system and a non-transitory computer readable medium storing software for operating at least one hypervisor. The software includes executable code that runs a first hypervisor as a first thread of an underlying operating system, executable code that runs a second hypervisor as a second thread of the underlying operating system, executable code that loads a first guest operating system using the first hypervisor based on the first thread of the underlying operating system, executable code that loads a second guest operating system using the second hypervisor based on the second thread of the underlying operating system, and executable code that schedules sharing of the processing resources of the underlying system between the first hypervisor and the second hypervisor according to a scheduler of the underlying operating system, where the first hypervisor and the second hypervisor run independently of each other. Executable code that schedules sharing of the resources may schedule fractional time shares for the first hypervisor and the second hypervisor to access the same resource. The same resource may include a CPU core of a storage system, and the underlying operating system may operate the storage system. Executable code that schedules sharing of the resources may schedule fractional time shares for the first hypervisor and the second hypervisor to access multiple resources in a symmetric multi-processing regime. The first hypervisor and the second hypervisor may be part of the same hypervisor running the first and second threads independently. The underlying operating system may operate a storage system, and the first and second hypervisors may be embedded with the storage system.

BRIEF DESCRIPTION OF THE DRAWINGS

Embodiments of the system described herein are explained with reference to the several figures of the drawings, which are briefly described as follows.

DETAILED DESCRIPTION OF VARIOUS EMBODIMENTS

Figure 1:
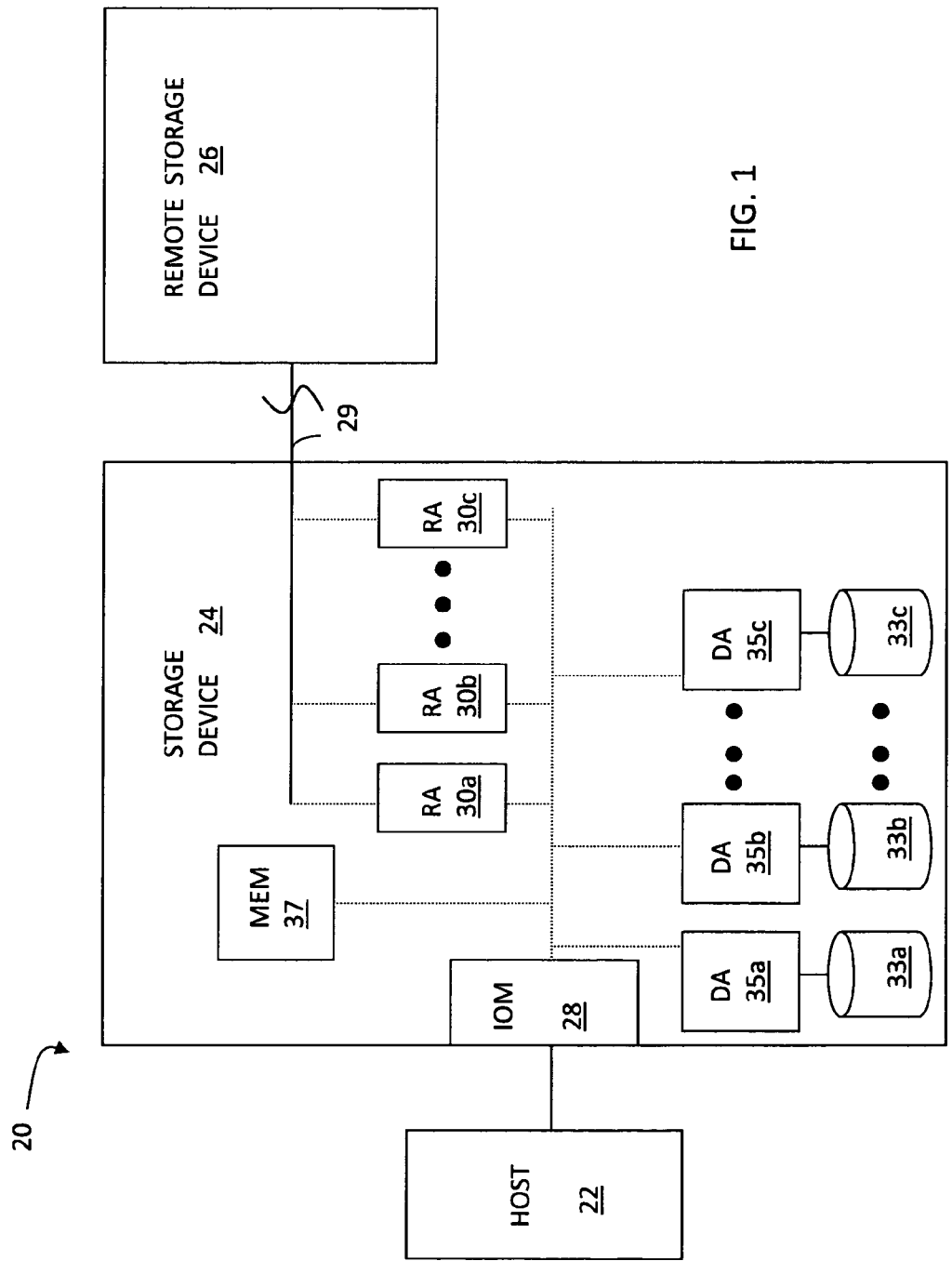
FIG. 1 is a schematic illustration of a storage system showing a relationship between a host and a storage device that may be used in connection with an embodiment of the system described herein.

FIG. 1 is a schematic illustration of a storage system 20 showing a relationship between a host 22 and a storage device 24 that may be used in connection with an embodiment of the system described herein. In an embodiment, the storage device 24 may be a Symmetrix storage system produced by EMC Corporation of Hopkinton, Mass. Also illustrated is another (remote) storage device 26 that may be similar to, or different from, the storage device 24 and may, in various embodiments, be coupled to the storage device 24, for example, via a network. The host 22 reads and writes data from and to the storage device 24 via an I/O module (IOM) 28, which facilitates the interface between the host 22 and the storage device 24. Although the diagram 20 only shows one host 22 and one TOM 28, it will be appreciated by one of ordinary skill in the art that multiple IOM's may be used and that one or more IOM's may have one or more hosts coupled thereto.

In an embodiment of the system described herein, data from the storage device 24 may be copied to the remote storage device 26 via a link 29. For example, the transfer of data may be part of a data mirroring or replication process, that causes the data on the remote storage device 26 to be identical to the data on the storage device 24. Although only the one link 29 is shown, it is possible to have additional links between the storage devices 24, 26 and to have links between one or both of the storage devices 24, 26 and other storage devices (not shown). The storage device 24 may include a first plurality of adapter units (RA's) 30a, 30b, 30c. The RA's 30a-30c may be coupled to the link 29 and be similar to the I/O Module 28, but are used to transfer data between the storage devices 24, 26.

The storage device 24 may include one or more disks, each containing a different portion of data stored on each of the storage device 24. FIG. 1 shows the storage device 24 including a plurality of disks 33a, 33b, 33c. The storage device (and/or remote storage device 26) may be provided as a stand-alone device coupled to the host 22 as shown in FIG. 1 or, alternatively, the storage device 24 (and/or remote storage device 26) may be part of a storage area network (SAN) that includes a plurality of other storage devices as well as routers, network connections, etc. The storage devices may be coupled to a SAN fabric and/or be part of a SAN fabric. The system described herein may be implemented using software, hardware, and/or a combination of software and hardware where software may be stored in a computer readable medium and executed by one or more processors.

Each of the disks 33a-33c may be coupled to a corresponding disk adapter unit (DA) 35a, 35b, 35c that provides data to a corresponding one of the disks 33a-33c and receives data from a corresponding one of the disks 33a-33c. An internal data path exists between the DA's 35a-35c, the IOM 28 and the RA's 30a-30c of the storage device 24. Note that, in other embodiments, it is possible for more than one disk to be serviced by a DA and that it is possible for more than one DA to service a disk. The storage device 24 may also include a global memory 37 that may be used to facilitate data transferred between the DA's 35a-35c, the TOM 28 and the RA's 30a-30c. The memory 37 may contain tasks that are to be performed by one or more of the DA's 35a-35c, the IOM 28 and the RA's 30a-30c, and a cache for data fetched from one or more of the disks 33a-33c.

The storage space in the storage device 24 that corresponds to the disks 33a-33c may be subdivided into a plurality of volumes or logical devices. The logical devices may or may not correspond to the physical storage space of the disks 33a-33c. Thus, for example, the disk 33a may contain a plurality of logical devices or, alternatively, a single logical device could span both of the disks 33a, 33b. Similarly, the storage space for the remote storage device 26 that comprises the disks 34a-34c may be subdivided into a plurality of volumes or logical devices, where each of the logical devices may or may not correspond to one or more of the disks 34a 34c.

Figure 2:
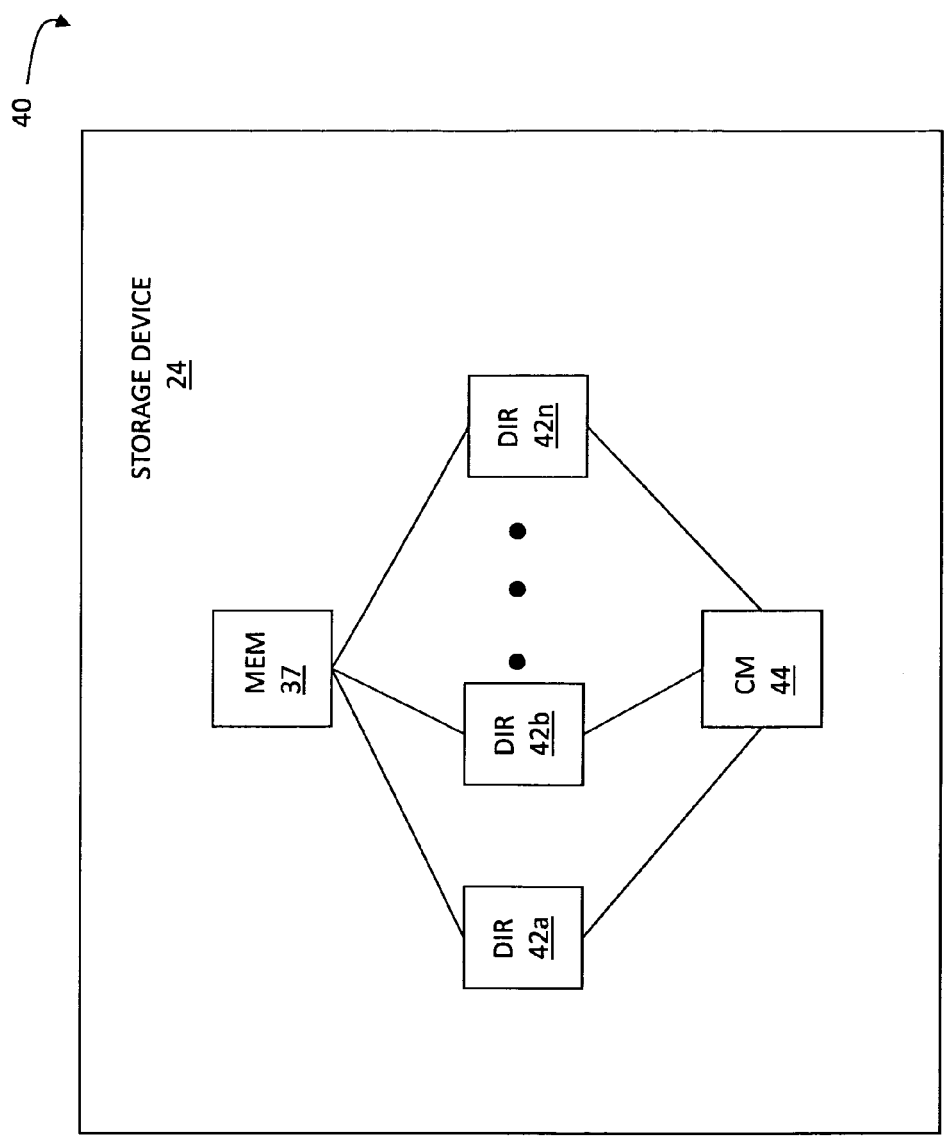
FIG. 2 is a schematic diagram illustrating an embodiment of the storage device where each of a plurality of directors are coupled to the memory.

FIG. 2 is a schematic diagram 40 illustrating an embodiment of the storage device 24 where each of a plurality of directors 42a-42n are coupled to the memory 37. Each of the directors 42a-42n represents at least one of the IOM 28, RAs 30a-30c, or DAs 35a-35c. The diagram 40 also shows an optional communication module (CM) 44 that provides an alternative communication path between the directors 42a-42n. Each of the directors 42a-42n may be coupled to the CM 44 so that any one of the directors 42a-42n may send a message and/or data to any other one of the directors 42a-42n without needing to go through the memory 26. The CM 44 may be implemented using conventional MUX/router technology where a sending one of the directors 42a-42n provides an appropriate address to cause a message and/or data to be received by an intended receiving one of the directors 42a-42n. Some or all of the functionality of the CM 44 may be implemented using one or more of the directors 42a-42n so that, for example, the directors 42a-42n may be interconnected directly with the interconnection functionality being provided on each of the directors 42a-42n. In addition, a sending one of the directors 42a-42n may be able to broadcast a message to all of the other directors 42a-42n at the same time.

In some embodiments, one or more of the directors 42a-42n may have multiple processor systems thereon and thus may be able to perform functions for multiple directors. In some embodiments, at least one of the directors 42a-42n having multiple processor systems thereon may simultaneously perform the functions of at least two different types of directors (e.g., an IOM and a DA). Furthermore, in some embodiments, at least one of the directors 42a-42n having multiple processor systems thereon may simultaneously perform the functions of at least one type of director and perform other processing with the other processing system. In addition, all or at least part of the global memory 37 may be provided on one or more of the directors 42a-42n and shared with other ones of the directors 42a-42n. In an embodiment, the features discussed in connection with the storage device 24 may be provided as one or more director boards having CPUs, memory (e.g., DRAM, etc.) and interfaces with Input/Output (I/O) modules, and in which multiple director boards may be networked together via a communications network, such as, for example, an internal Ethernet communications network, a serial rapid I/O (SRIO) fabric and/or Infiniband fabric (v3).

Figure 3:
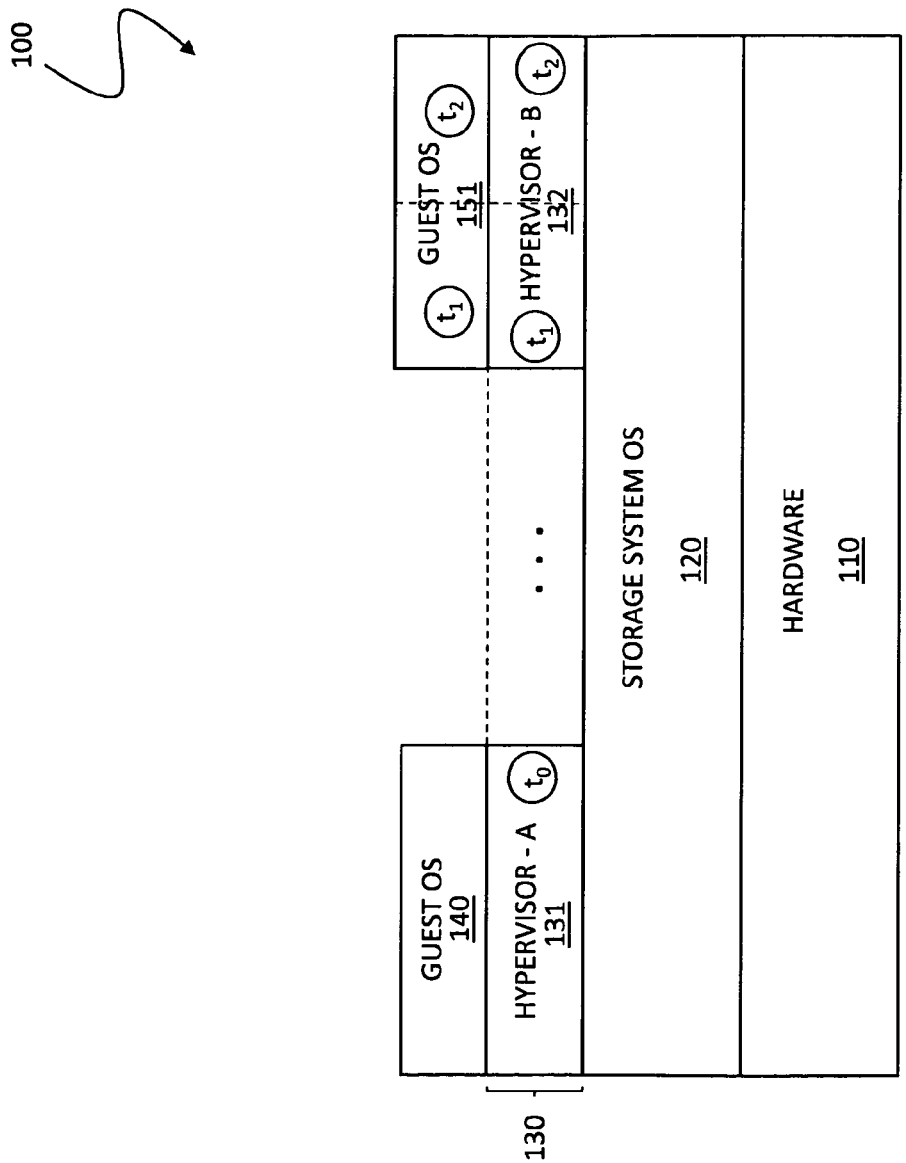
FIG. 3 is a schematic illustration showing hardware and software layers for a storage system, including independent hypervisors as threads, according to an embodiment of the system described herein.

FIG. 3 is a schematic illustration showing hardware and software layers for a storage system 100, including independent hypervisors as threads, according to an embodiment of the system described herein. In an embodiment, the storage system 100 may be a Symmetrix storage system produced by EMC Corporation of Hopkinton, Mass. A hardware layer 110 includes hardware components for the storage system 100, such as memory and processors (CPUs) and/or other components like that discussed in connection with FIGS. 1 and 2. A storage system operating system (OS)

layer 120 is shown as the operating system for the storage system 100. In an embodiment, the OS layer 120 may be a Symmetrix storage system OS, such as Enginuity, with a Symm/K kernel that provides OS services and scheduling. Other operating systems may be used, such as the Linux operating system.

An instance is a single binary image of the OS that performs a specific set of operations. In an embodiment, there may be up to eight instances configured on a director board at any given time. A thread is a separately schedulable set of code or process of an instance. Threads may be co-operative and/or preemptive, and may be scheduled by the OS. An instance may run on more than one core, that is, an instance may provide a symmetric multiprocessing (SMP) environment to threads running within the instance.

According to the system described herein, a thread may be provided that runs as a hypervisor within the storage system OS environment. As previously discussed, a hypervisor is a software implementation providing a software virtualization environment in which other software may run with the appearance of having full access to the underlying system hardware, but in which such access is actually under the complete control of the hypervisor. The hypervisor running as the OS thread may be called a container hypervisor. The container hypervisor may manage a virtual hardware environment for a guest operating system (Guest OS), and, in an embodiment, the container hypervisor may run multiple OS threads (e.g., 1 to N threads) within a single instance. The Guest OS is an operating system that may be loaded by a thread of the container hypervisor, and runs in the virtual environment provided by the container hypervisor. The Guest OS may also access real hardware devices attached to a director board using a virtual device provided by the container hypervisor or via a peripheral component interconnect (PCI) pass-through device/driver. There may be multiple container hypervisors running within a single instance at the same time. There may also be multiple container hypervisors running within different instances on the same director board at the same time.

In FIG. 3, a hypervisor layer 130 is shown as including hypervisor-A 131 and hypervisor-B 132 that may be examples of container hypervisors in accordance with the system described herein. Each of the container hypervisors 131, 132 may run as threads embedded within the storage system OS operating environment (the storage system OS 120). The container hypervisor 131 is shown running as a thread $t_0$ and may be running independently of the container hypervisor 132. The container hypervisor 132 is shown running two threads $t_1$ and $t_2$. These threads may run independently of each other as well as the thread $t_0$ of the container hypervisor 131. The independent operation of the threads $t_1$ and $t_2$ of the container hypervisor 132 is shown schematically with a dashed line. In each case, the threads $t_0$, $t_1$ and $t_2$ of the container hypervisors 131, 132 may run as threads of one or more instances of the storage system OS 120. For example, in an embodiment, the container hypervisors 131, 132 may be threads running as part of an Enginuity instance or a Linux instance. The container hypervisors 131, 132 may be scheduled like any other thread and may be preempted and interrupted as well as started and stopped. Advantageously, since the container hypervisors 131, 132 runs as threads within the storage system OS environment, physical resource sharing of the underlying hardware is already provided for according to the storage system OS scheduling.

According to an embodiment of the system described herein, a Guest OS 140 is loaded using the thread $t_0$ of the container hypervisor-A 131 and, for example, runs an application in the virtual environment provided thereby. As shown, a Guest OS 151 may be loaded using independent threads $t_1$, $t_2$ of the container hypervisor 132. As further discussed elsewhere herein, threads $t_0$, $t_1$ and $t_2$ may all be run independently of each other. The ability to run a container hypervisor as a storage system OS thread provides that the storage system 100 may run with no performance penalty until the container hypervisor thread is enabled. Even when the hypervisor thread is enabled and running an application in a Guest OS, the performance impact may be controlled. Additionally, developments in physical hardware may be accommodated through a software development process that is decoupled from modifications to the hypervisor code. Accordingly, releases of new storage device code, hypervisor code and Guest OS, and applications code may all be realized in an independent manner.

In various embodiments, the container hypervisors 131, 132 may each provide for one or more of the following features: boot a Guest OS; run the Guest OS as a storage system OS thread (e.g., Symm/K); be scheduled, preemptable, etc.; reset the Guest OS without restarting the instance; allow the Guest OS to access storage devices (e.g., Symmetrix) using a Cut-through Device (CTD), as further discussed elsewhere herein; and allow the Guest OS to access the I/O Modules using a PCI pass-through device.

Figure 4:
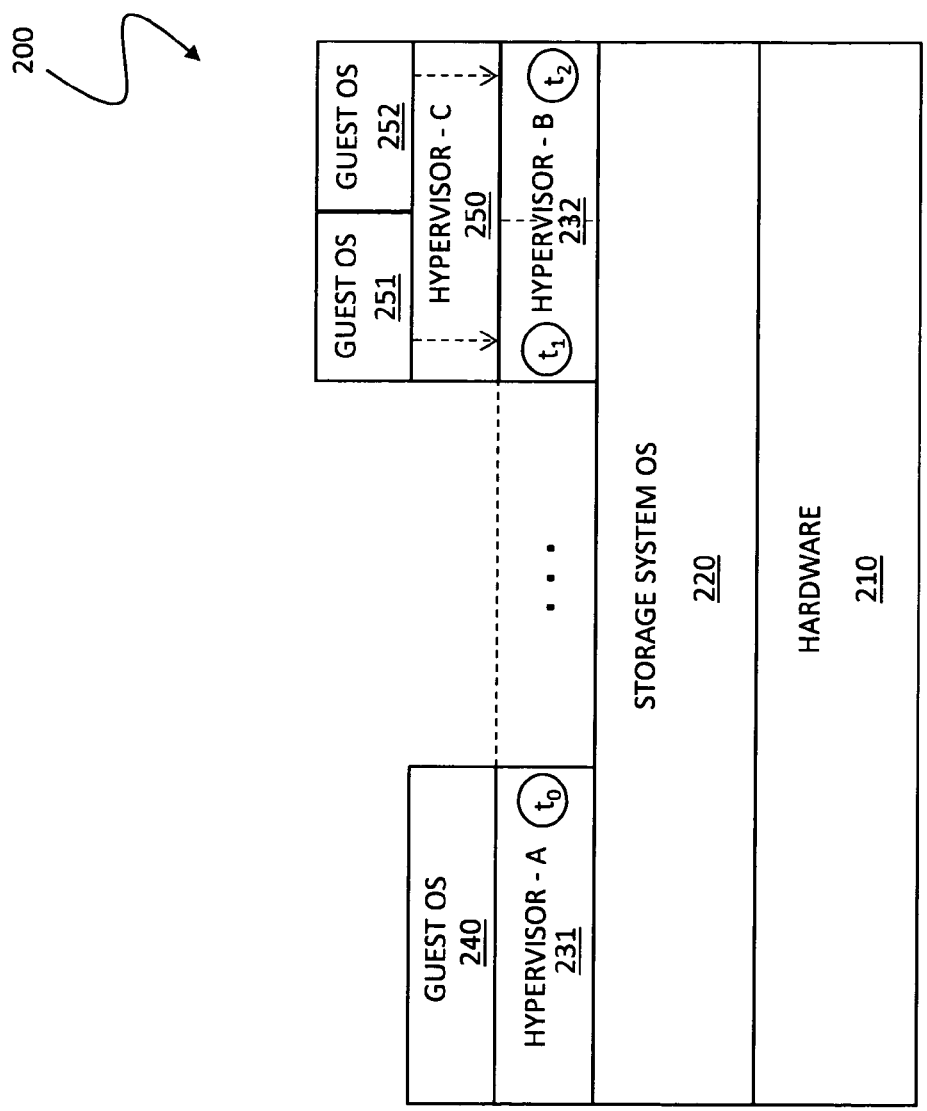
FIG. 4 is a schematic illustration showing a storage system with nested hypervisors according to another embodiment of the system described herein.

FIG. 4 is a schematic illustration showing a storage system 200 with nested hypervisors according to another embodiment of the system described herein. Like the storage system 100 previously discussed, the storage system 200 may include a hardware layer 210 and a storage system OS layer 220. A Guest OS 240 may be loaded using the thread $t_0$ of a container hypervisor (hypervisor-A) 231. As shown in connection with a container hypervisor (hypervisor-B) 232, the container hypervisor 232 may host one or more other hypervisors (hypervisor-C 250). In various embodiments, the hypervisor-C 250 may be another container hypervisor and/or may be another type of hypervisor, such as VMware's ESXi. The ability to host another hypervisor (hypervisor-C 250), as a nested hypervisor, provides the capability of the system 200 to host any guest operating system, such as Guest OS's 251, 252 (e.g., Linux) that may be hosted by the hypervisor 250 (e.g., ESXi) itself without needing to modify the code of the container hypervisor 232. It is noted that additional layers of hypervisors may further be nested in accordance with the system described herein. By embedding hypervisors within hypervisors in a storage system environment in the manner according to the system described herein, physical resource sharing may be provided using the storage system OS scheduling and, thereby, resource trampling that may occur with the addition of another hypervisor, without such system OS scheduling, is avoided.

Figure 5:
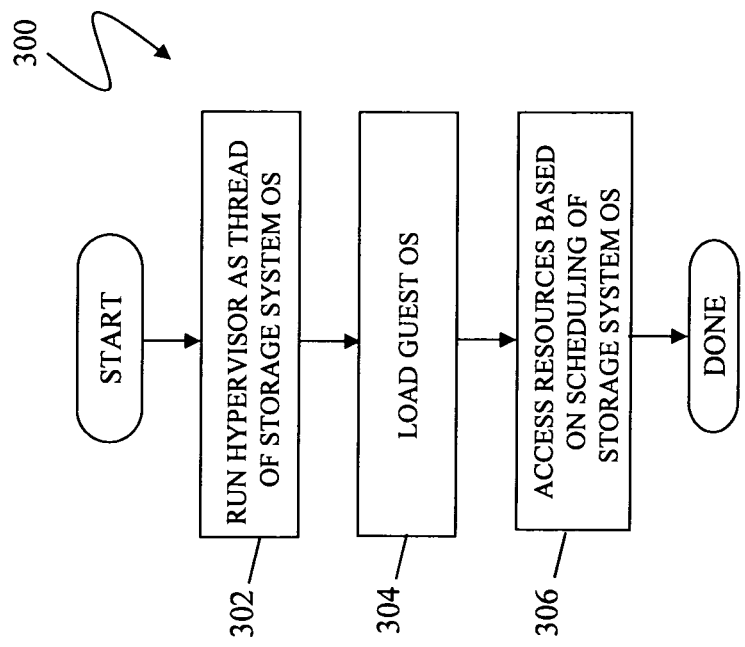
FIG. 5 is a flow diagram showing processing for operating a hypervisor and a guest operating system according to various embodiments of the system described herein.

FIG. 5 is a flow diagram 300 showing processing for operating a hypervisor and a Guest OS according to various embodiments of the system described herein. At a step 302, a container hypervisor is run as a thread of an underlying OS, for example, a storage system OS, such as Enginuity with Symm/K operating a Symmetrix storage system or the Linux operating system. After the step 302, processing proceeds to a step 304 where a Guest OS is loaded using the container hypervisor based on the thread of the storage system OS. The container hypervisor may be run independently of the Guest OS and independently of other hypervisors running as other threads of the storage system OS. After the step 304, processing proceeds to a step 306 where the hypervisor accesses resources according to a scheduler of the storage system OS and in connection with resource requirements of the Guest OS (and/or an application of the Guest OS). As further discussed elsewhere herein, the hypervisor may share resources with the other hypervisors according to the scheduling of the storage system OS. In an embodiment, the container hypervisor may be embedded with the storage system OS. As further discussed elsewhere herein, code of container hypervisor may be modified independently of code of the Guest OS and/or code of other hypervisors running as threads of the storage system OS. After the step 306, processing is complete. One or more of the above-noted processing steps may be implemented via executable code stored on a non-transitory computer readable medium and executable by at least one processor according to an embodiment of the system described herein.

Figure 6:
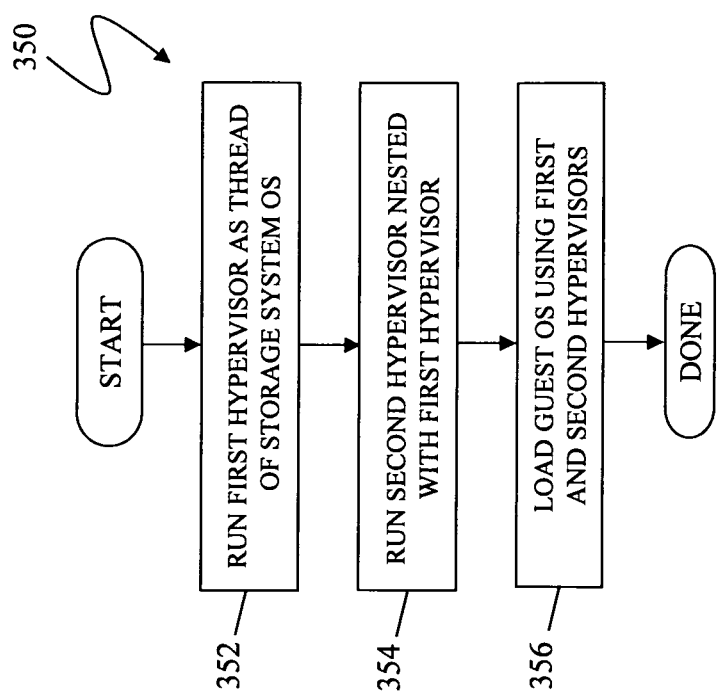
FIG. 6 is a flow diagram showing processing for operating nested hypervisors according to an embodiment of the system described herein.

FIG. 6 is a flow diagram 350 showing processing for operating nested hypervisors according to an embodiment of the system described herein. At a step 352, a container hypervisor (e.g., a first hypervisor) is run as a thread of an underlying OS, for example, a storage system OS, such as Enginuity with Symm/K operating a Symmetrix storage system. After the step 352, processing proceeds to a step 354, where a second hypervisor is run nested, and/or embedded within, the first hypervisor (the container hypervisor). In various embodiments, the second hypervisor may be a known hypervisor (e.g., ESXi) and/or may be another container hypervisor. Other hypervisors may be further nested in accordance with the system described herein. After the step 354, processing proceeds to a step 356, where a Guest OS is loaded using the first (container) hypervisor and the second hypervisor. After the step 356, processing is complete. One or more of the above-noted processing steps may be implemented via executable code stored on a non-transitory computer readable medium and executable by at least one processor according to an embodiment of the system described herein.

According to the system described herein, when the container hypervisor starts the Guest OS, the Guest OS may run in the context of the container hypervisor. The container hypervisor may access all of the Guest's memory while the Guest may only access the memory given to it by the container hypervisor. In order to avoid time-consuming calls that cause an exit from a VM (e.g., vmexit) as a result of certain Guest OS activities, virtual PCI devices may be used in connection with the container hypervisor. A virtual PCI device looks and behaves like normal PCI hardware to the Guest OS. Guest OS access to memory mapped I/O (MMIO) space does not necessarily cause a vmexit, depending on the virtual PCI device code of the container hypervisor. To allow I/O with the storage system (e.g., Symmetrix), a Cut-through Device (CTD) may be used that may be a virtual PCI device used in connection with the container hypervisor.

Figure 7:
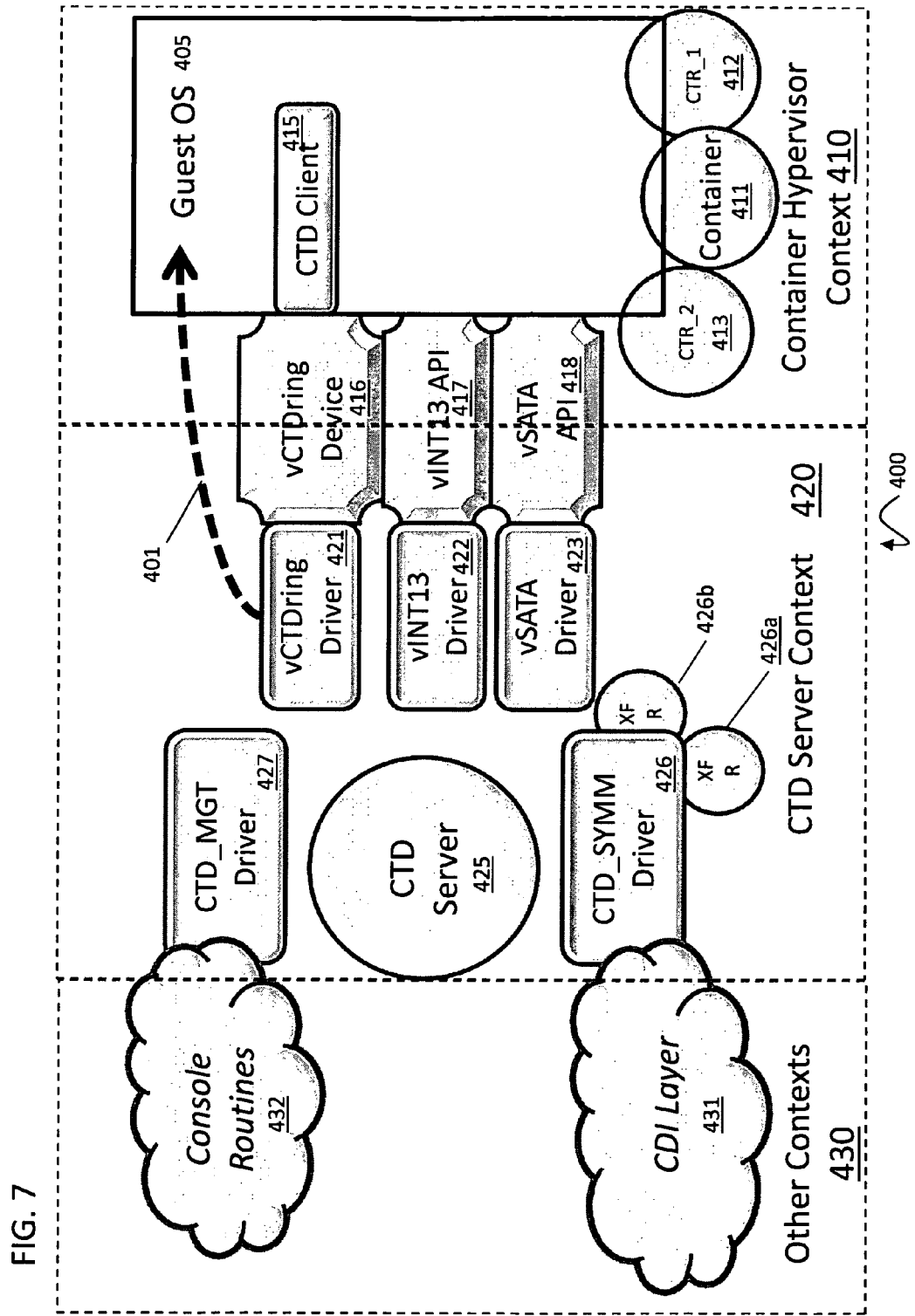
FIG. 7 is a schematic illustration of a cut-through-device subsystem used in connection with a container hypervisor according to an embodiment of the system described herein.

FIG. 7 is a schematic illustration of a CTD device subsystem 400 used in connection with a container hypervisor according to an embodiment of the system described herein. A protocol of the CTD device 400 may be built around small computer system interface (SCSI) control data blocks (CDBs). In an embodiment, the CTD device protocol may include data structures for scatter and gather of entry arrays, client requests and/or server completions. The CTD device 400 is shown operating in connection with container hypervisor context 410 that may include operation with one or more container hypervisor contexts 411-413. The CTD device 400 may use a particular driver (the CTD Client 415) in a Guest OS 405 loaded in connection with the container hypervisor. The CTD device 400 may have a further subsystem (the CTD Server 425) that runs in its own context (the CTD Server Context 420). There may be a virtual PCI device: vCTDring 416, and/or other application programming interfaces (APIs) used, such as vINT13 API 417 and vSATA API 418. Each device or API may have a driver (vCTDring Driver 421, vINT13 Driver 422, and vSATA driver 423) to interface therewith. The interaction of the vCTDring 416 of the CTD device 400 with the Guest OS 405 is shown schematically with arrow 401. In various embodiments, there may be separate threads to service each driver that runs in its own context. Other drivers, such as CTD_MGT Driver 426 (with associated components 426a, 426b) and CTD_SYMM Driver 427, may be included in connection with operation of the CTD Server for management and control in connection with other contexts 430, including a common device interface (CDI) layer 431 for the storage system and/or other console routines 432.

According to another embodiment, by using a thread of a container hypervisor in the storage system OS environment (e.g., Enginuity running Symm/K), it is possible for a Guest OS to operate in several modes. The container hypervisor thread may inherit the same number of CPU cores as that of the OS instance and may run as a single thread on those cores when active. However, since the container hypervisor is running as a thread, rather than being scheduled as an OS instance, as described elsewhere herein, other OS threads may also continue to run on other cores in the same SMP environment. The use of the OS scheduling algorithms (e.g., Symm/K) for scheduling the threads of the container hypervisors thus provide the ability to schedule fractions of CPU time on multiple cores for the Guest OS's. Furthermore, it is possible for the container hypervisor to allocate fewer virtual cores than physical cores available to the instance, and allow the Guest OS to operate SMP on those cores while still allowing other OS threads to operate with full CPU core resources, and to adjust the CPU allocation between Guest OS's and other threads. In an embodiment, in a VMAX system from EMC Corporation of Hopkinton, Mass., the granularity of the CPU time scheduling according to the system described herein may be on the order of 500 microseconds or less.

Figure 8:
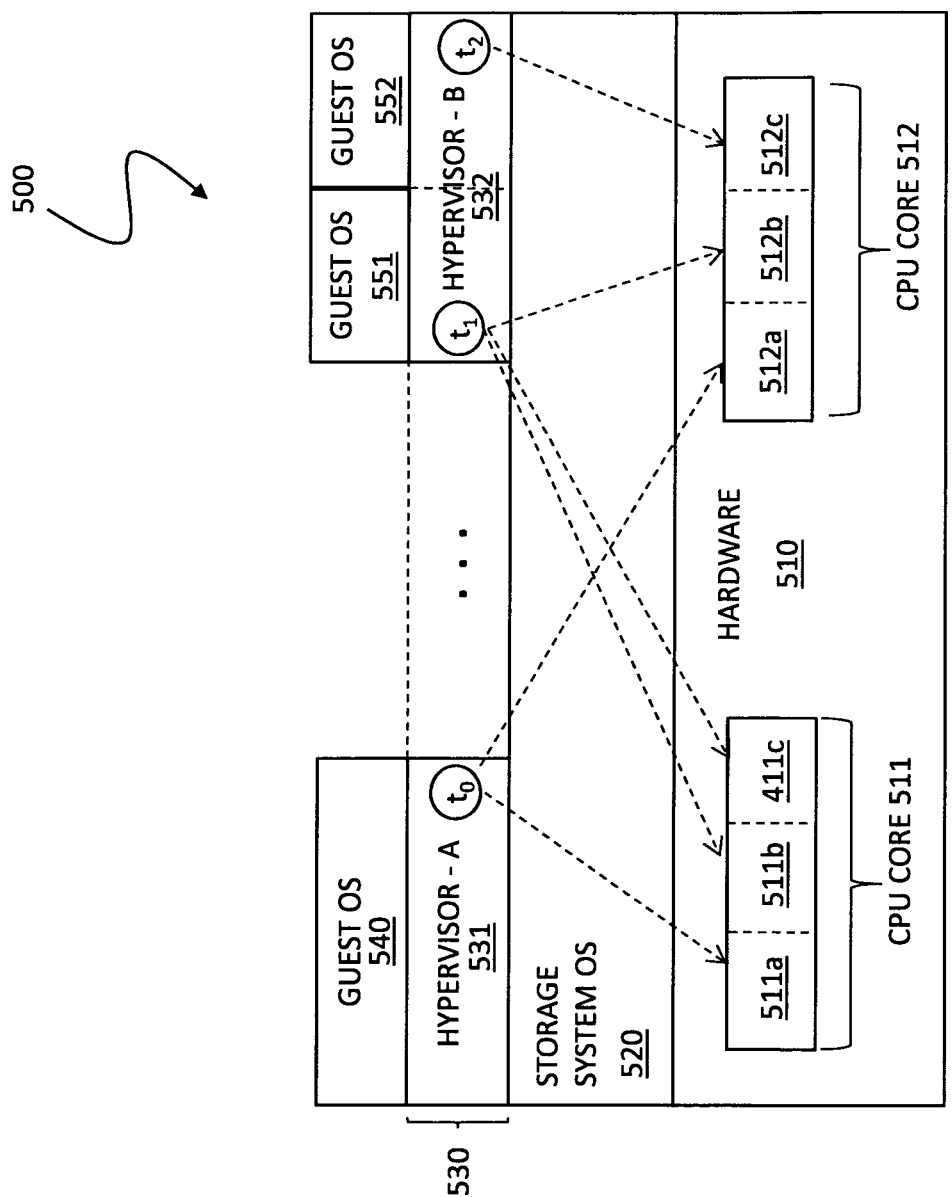
FIG. 8 is a schematic illustration showing a storage system with fractional SMP capabilities extended to one or more guest operating systems according to an embodiment of the system described herein.

FIG. 8 is a schematic illustration showing a storage system 500 with fractional SMP capabilities extended to one or more Guest OS's 540, 551, 552 according to an embodiment of the system described herein. The storage system 500 includes a hardware layer 510, a storage system OS layer 520 and a container hypervisor layer 530, with a container hypervisor 531 (hypervisor-A) and a container hypervisor 532 (hypervisor-B) illustrated by way of example. The Guest OS's 540, 551 and 552 may be loaded using the container hypervisors 531, 532. The container hypervisors 531, 532 map virtual CPU cores to the physical CPU cores 511, 512 of the hardware layer 510. That is, in accordance with the system described herein, the one or more Guest OS's may only have access to a different number of available CPU cores (virtual CPU cores) than are available as physical CPU cores on the hardware 510. Through the use of the container hypervisors 531, 532 running as storage system OS threads $t_0$, $t_1$, and $t_2$ (rather than being scheduled as storage system OS instances), the system described herein provides for the ability to schedule fractions of CPU time on multiple cores for one or more of the Guest OS's 540, 551, 552 according to the scheduling algorithms of the storage system OS components (e.g., Symm/K).

The scheduling of fractional CPU time on the physical CPU cores 511, 512 is shown schematically as fractions 511a-c and 512a-c of each of the CPU cores 511, 512. Each of the threads $t_0$, $t_1$, and $t_2$ of the container hypervisors 531, 532 may operate in an SMP regime on multiple ones of the cores 511, 512 while allowing others of the threads to also operate with full CPU core resources. The system described herein provides for flexible control of physical CPU allocation between Guest OS's 540, 551, 552 without causing one or more of the Guest OS's 540, 551, 552 to become inactive due to resource overlaps. In this way, the Guest OS's 540, 551, 552 may run based on the threads of the container hypervisors 531, 532 using varying amounts of CPU time per CPU core in an SMP regime.

Figure 9:
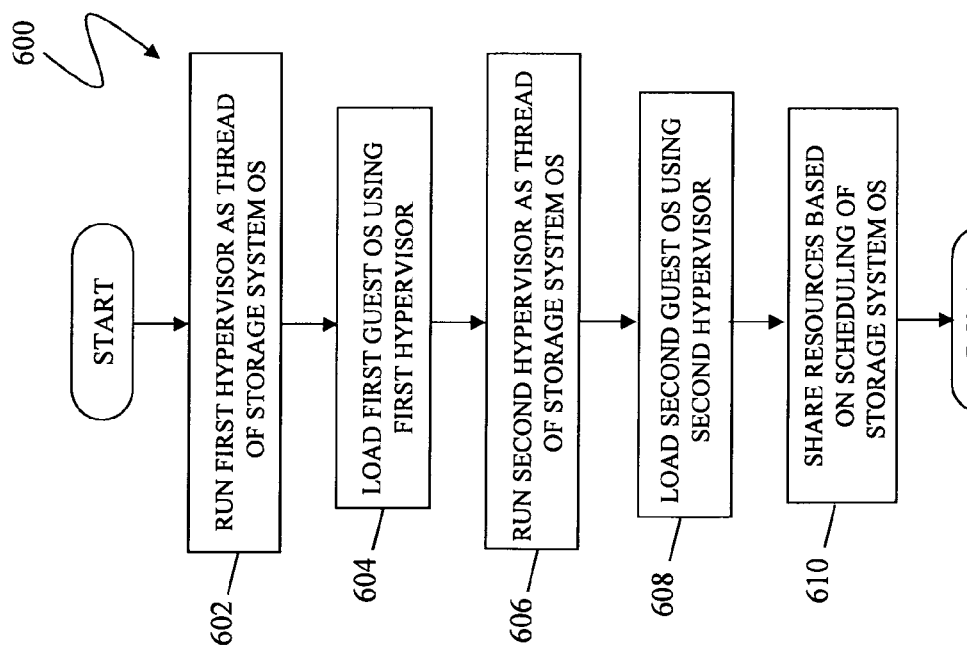
FIG. 9 is a flow diagram showing processes for fractional resource scheduling with multiple hypervisors according to an embodiment of the system described herein.

FIG. 9 is a flow diagram 600 showing processes for fractional resource scheduling with multiple hypervisors according to an embodiment of the system described herein. At a step 602, a first container hypervisor is run as a thread of an underlying OS, for example, a storage system OS, such as Enginuity with Symm/K operating a Symmetrix storage system. After the step 602, processing proceeds to a step 604 where a first Guest OS is loaded using the first container hypervisor based on the thread of the storage system OS. After the step 604, processing proceeds to a step 606 where a second container hypervisor is run as a thread of the storage system OS. After the step 606, processing proceeds to a step 608 where a second Guest OS is loaded using the second container hypervisor based on the thread of the storage system OS. It is noted that, in various embodiments, the first and second container hypervisors may be run independently of each other and may be run independently of the first and second Guest OS's, such that modifications to code of each of the hypervisors may be done independently of each other, independently of modifications to the Guest OS's and/or independently of modifications to code of the storage system OS.

After the step 608, processing proceeds to a step 610 where the first and second container hypervisors may share resources according to fractional resource sharing scheduled by the scheduler (Symm/K) of the storage system OS and in connection with separate resource requirements of the first and second Guest OS's (and/or an application of the first and second Guest OS's). It is noted that, in various embodiments, the fractional resource scheduling depicted in illustration 600 may be implemented according to systems like that shown in FIGS. 3 and 4. One or more of the above-noted processing steps may be implemented via executable code stored on a non-transitory computer readable medium and executable by at least one processor according to an embodiment of the system described herein.

Various embodiments discussed herein may be combined with each other in appropriate combinations in connection with the system described herein. Additionally, in some instances, the order of steps in the flowcharts, flow diagrams and/or described flow to processing may be modified, where appropriate. Further, various aspects of the system described herein may be implemented using software, hardware, a combination of software and hardware and/or other computer-implemented modules or devices having the described features and performing the described functions. Software implementations of the system described herein may include executable code that is stored in a computer readable medium and executed by one or more processors. The computer readable medium may include a computer hard drive, ROM, RAM, flash memory, portable computer storage media such as a CD-ROM, a DVD-ROM, a flash drive and/or other drive with, for example, a universal serial bus (USB) interface, and/or any other appropriate tangible or non-transitory computer readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method for operating a storage system, comprising:
providing an underlying operating system for the storage system;
the underlying operating system scheduling a first hypervisor as a first thread of the underlying operating system;
the underlying operating system scheduling a second hypervisor as a second thread of the underlying operating system, wherein each of the first hypervisor and the second hypervisor inherits a number of physical cores from the underlying operating system corresponding to a number of physical cores available to the underlying operating system;
loading a first guest operating system using the first hypervisor based on the first thread of the underlying operating system, wherein the first hypervisor maps the first guest operating system to fewer virtual cores and fewer physical cores than the number of the physical cores inherited from the underlying operating system by the first hypervisor;
loading a second guest operating system using the second hypervisor based on the second thread of the underlying operating system, wherein the second hypervisor maps the second guest operating system to fewer virtual cores and fewer physical cores than the number of the physical cores inherited from the underlying operating system by the second hypervisor; and
scheduling sharing of resources of the underlying system between the first hypervisor and the second hypervisor and the underlying operating system according to a scheduler of the underlying operating system and according to separate resource requirements of the first and second guest operating systems and applications of the first and second guest operating systems, wherein the first hypervisor and the second hypervisor run independently of each other and wherein under control of the underlying operating system the first guest operating system and the second guest operating system share at least one of the physical cores, of the physical cores that are respectively mapped to the first and second guest operating system, using different fractions of time according to scheduling algorithms, using the separate resource requirements, managed by the underlying operating system and wherein other threads of the underlying operating system, different from the first thread and the second thread, operate using all of the physical cores from the underlying operating system.

2. The method according to claim 1, wherein the scheduler of the underlying operating system schedules fractional time shares for the first hypervisor and the second hypervisor to access a same resource.

3. The method according to claim 2, wherein the same resource is a CPU core of a storage system.

4. The method according to claim 1, wherein the scheduler of the underlying operating system schedules fractional time shares for the first hypervisor and the second hypervisor to access multiple resources operating in a symmetric multi-processing regime.

5. The method according to claim 1, wherein the first hypervisor and the second hypervisor are part of a same hypervisor running the first and second threads independently.

6. The method according to claim 1, wherein the first hypervisor and the second hypervisor run independently of the first and second guest operating systems.

7. The method according to claim 1, wherein the first and second hypervisors are embedded with the storage system.

8. A non-transitory computer readable medium storing software for operating a storage system, the software comprising:
 an underlying operating system for the storage system;
 executable code that schedules a first hypervisor to run as a first thread of the underlying operating system;
 executable code that schedules a second hypervisor to run as a second thread of the underlying operating system, wherein each of the first hypervisor and the second hypervisor inherits a number of physical cores from the underlying operating system corresponding to a number of physical cores available to the underlying operating system;
 executable code that loads a first guest operating system using the first hypervisor based on the first thread of the underlying operating system, wherein the first hypervisor maps the first guest operating system to fewer virtual cores and fewer physical cores than the number of the physical cores inherited from the underlying operating system by the first hypervisor;
 executable code that loads a second guest operating system using the second hypervisor based on the second thread of the underlying operating system, wherein the second hypervisor maps the second guest operating system to fewer virtual cores and fewer physical cores than the number of the physical cores inherited from the underlying operating system by the second hypervisor; and
 executable code that schedules sharing resources of the underlying system between the first hypervisor and the second hypervisor and the underlying operating system according to a scheduler of the underlying operating system and according to separate resource requirements of the first and second guest operating systems and applications of the first and second guest operating systems, wherein the first hypervisor and the second hypervisor run independently of each other and wherein under control of the underlying operating system the first guest operating system and the second guest operating system share at least one of the physical cores, of the physical cores that are respectively mapped to the first and second guest operating system, using different fractions of time according to scheduling algorithms, using the separate resource requirements, managed by the underlying operating system and wherein other threads of the underlying operating system, different from the first thread and the second thread, operate using all of the physical cores from the underlying operating system.

9. The non-transitory computer readable medium according to claim 8, wherein executable code that schedules sharing of the resources schedules fractional time shares for the first hypervisor and the second hypervisor to access a same resource.

10. The non-transitory computer readable medium according to claim 9, wherein the same resource includes a CPU core of a storage system.

11. The non-transitory computer readable medium according to claim 8, wherein executable code that schedules sharing of the resources schedules fractional time shares for the first hypervisor and the second hypervisor to access multiple resources operating in a symmetric multi-processing regime.

12. The non-transitory computer readable medium according to claim 8, wherein the first hypervisor and the second hypervisor are part of a same hypervisor running the first and second threads independently.

13. The non-transitory computer readable medium according to claim 8, wherein the first hypervisor and the second hypervisor run independently of the first and second guest operating systems.

14. The non-transitory computer readable medium according to claim 8, wherein the first and second hypervisors are embedded with the storage system.

15. A system for operating a storage system, comprising:
 at least one processor providing processing resources for an underlying operating system for the storage system; and
 a non-transitory computer readable medium storing software for operating the storage system, the software including:
  an underlying operating system for the storage system;
  executable code that schedules a first hypervisor to run as a first thread of the underlying operating system;
  executable code that schedules a second hypervisor to run as a second thread of the underlying operating system, wherein each of the first hypervisor and the second hypervisor inherits a number of physical cores from the underlying operating system corresponding to a number of physical cores available to the underlying operating system;
  executable code that loads a first guest operating system using the first hypervisor based on the first thread of the underlying operating system, wherein the first hypervisor maps the first guest operating system to fewer virtual cores and fewer physical cores than the number of the physical cores inherited from the underlying operating system by the first hypervisor;
  executable code that loads a second guest operating system using the second hypervisor based on the second thread of the underlying operating system, wherein the second hypervisor maps the second guest operating system to fewer virtual cores and fewer physical cores than the number of the physical cores inherited from the underlying operating system by the second hypervisor; and
  executable code that schedules sharing resources of the underlying system between the first hypervisor and the second hypervisor and the underlying operating system according to a scheduler of the underlying operating system and according to separate resource requirements of the first and second guest operating systems and applications of the first and second guest operating systems, wherein the first hypervisor and the second hypervisor run independently of each other and wherein under control of the underlying operating system the first guest operating system and the second guest operating system share at least one of the physical cores, of the physical cores that are respectively mapped to the first and second guest operating system, using different fractions of time according to scheduling algorithms, using the separate resource requirements, managed by the underlying operating system and wherein other threads of the underlying operating system, different from the first thread and the second thread, operate using all of the physical cores from the underlying operating system.

16. The system according to claim 15, wherein executable code that schedules sharing of the resources schedules fractional time shares for the first hypervisor and the second hypervisor to access a same resource.

17. The system according to claim 16, wherein the same resource includes a CPU core of a storage system.

18. The system according to claim 15, wherein executable code that schedules sharing of the resources schedules fractional time shares for the first hypervisor and the second hypervisor to access multiple resources in a symmetric multi-processing regime.

19. The system according to claim 15, the first hypervisor and the second hypervisor are part of a same hypervisor running the first and second threads independently.

20. The system according to claim 15, wherein the first and second hypervisors are embedded with the storage system.

* * * * *